United States Patent
Lu

(10) Patent No.: US 8,301,801 B2
(45) Date of Patent: Oct. 30, 2012

(54) BLADE SYSTEM AND METHOD FOR ESTABLISHING A SHORTEST PATH TO TRANSMIT PACKETS AMONG BLADE SERVERS OF THE BLADE SYSTEM

(75) Inventor: Tsung-En Lu, Taipei-Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 272 days.

(21) Appl. No.: 12/902,106

(22) Filed: Oct. 11, 2010

(65) Prior Publication Data
US 2012/0054366 A1    Mar. 1, 2012

(30) Foreign Application Priority Data
Aug. 24, 2010 (CN) .......................... 2010 1 0261434

(51) Int. Cl.
*G06F 15/173* (2006.01)
*G06F 15/177* (2006.01)

(52) U.S. Cl. ......... 709/241; 709/220; 709/224; 709/238

(58) Field of Classification Search .................. 709/239, 709/242; 370/237, 254, 392, 395.53
See application file for complete search history.

(56) References Cited

U.S. PATENT DOCUMENTS

| | | | |
|---|---|---|---|
| 6,987,735 B2 * | 1/2006 | Basso et al. ................... | 709/239 |
| 8,005,013 B2 * | 8/2011 | Teisberg et al. ............... | 370/254 |
| 2003/0002443 A1 * | 1/2003 | Basso et al. ................... | 370/237 |
| 2006/0092940 A1 * | 5/2006 | Ansari et al. .................. | 370/392 |
| 2008/0310421 A1 * | 12/2008 | Teisberg et al. .......... | 370/395.53 |

\* cited by examiner

*Primary Examiner* — Quang N. Nguyen
(74) *Attorney, Agent, or Firm* — Altis Law Group, Inc.

(57) ABSTRACT

A blade system and method establishes a shortest path to transmit packets in blade servers of the blade system. The blade system reads status information of each blade server using a shelf manager and connection information among the blade servers. A shortest path among the blade servers is calculated by a depth-first search (DFS) algorithm according to the connection information. The blade system sets a configuration file of the each blade server to transmit the packets among the blade servers according to the calculated shortest path.

9 Claims, 4 Drawing Sheets

US 8,301,801 B2

BLADE SYSTEM AND METHOD FOR ESTABLISHING A SHORTEST PATH TO TRANSMIT PACKETS AMONG BLADE SERVERS OF THE BLADE SYSTEM

BACKGROUND

1. Technical Field

Embodiments of the present disclosure relate to detection technology, and particularly to a blade system and method for establishing a shortest path to transmit packets to blade servers of the blade system.

2. Description of Related Art

A blade system is a server chassis housing multiple blade servers (or blade). The blade servers comprise processors, memory, integrated network controllers, an optional fiber channel host bus adaptor (HBA) and other input/output (IO) ports.

It is necessary to test the blade servers when the blade system is manufactured. The method to test the blade servers is to send packets among the blade servers and test if each blade server works normally using the packets. However, there are many paths to transmit the packets among the blade servers. Different paths take different times to test. For example, the longest path may take three days, but the shortest path may take less than one second.

DETAILED DESCRIPTION

All of the processes described below may be embodied in, and fully automated via, function modules executed by one or more general purpose processors of a computer. Some or all of the methods may alternatively be embodied in specialized hardware. The function modules may be stored in any type of computer-readable medium or other computer storage device.

Figure 1:
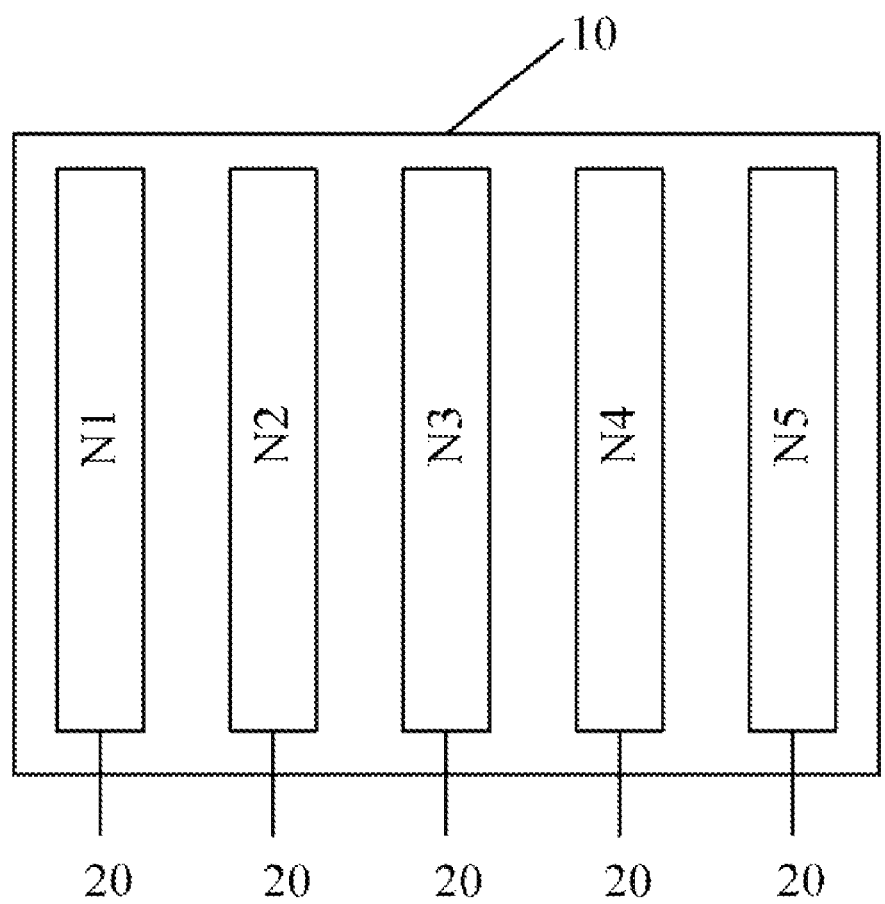
FIG. 1 is a systematic diagram of one embodiment of a blade system.

FIG. 1 is a systematic diagram of one embodiment of a blade system 10. The blade system 10 includes one or more blade servers 20 (e.g., N1, N2, N3, N4, and N5). In one embodiment, the blade system 10 may be, but is not limited to, an advanced telecom computing architecture (ATCA) blade system.

Each of the blade servers 20 includes a switch. The switch is used to establish a communication connection between two blade servers 20. For example, the switch in N1 sends a connection command to the switch in N2 to establish the communication connection with N2.

Figure 2:
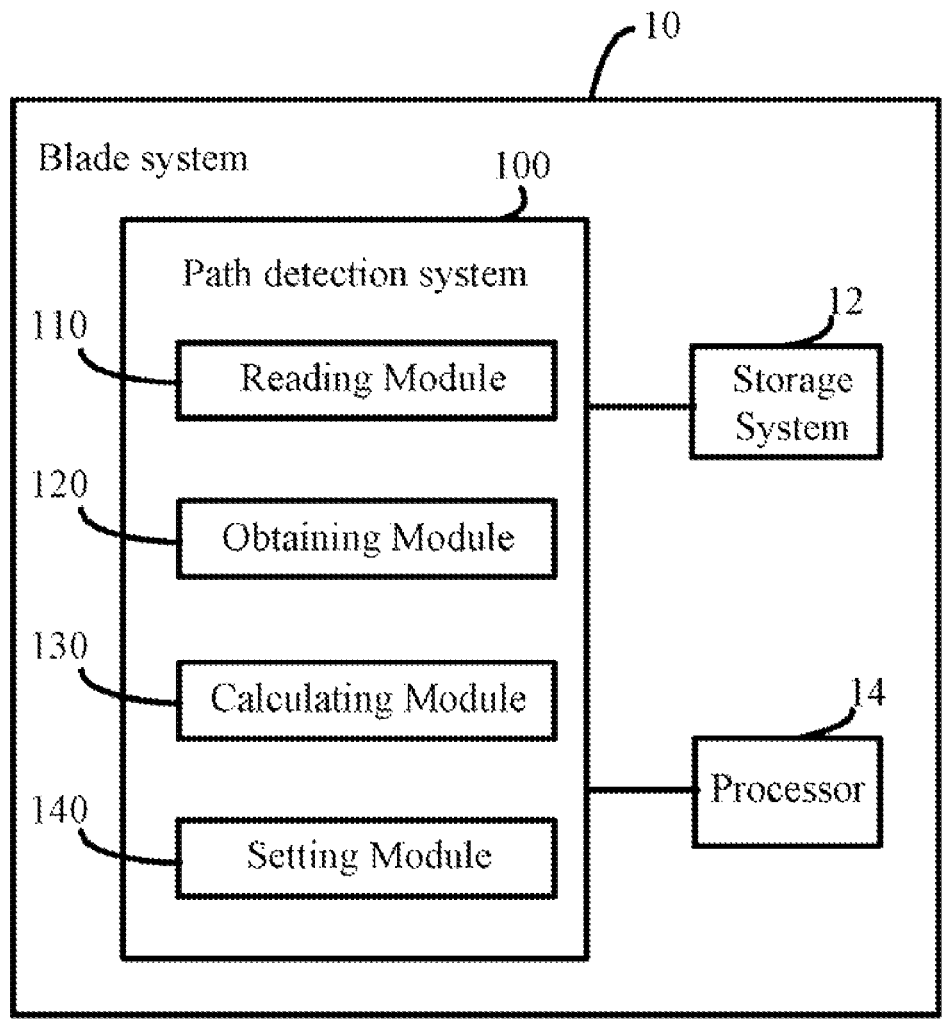
FIG. 2 is a block diagram of one embodiment of the blade system of a path detection system in FIG. 1.

FIG. 2 is a block diagram of one embodiment of the blade system 10 including a path detection system 100. The blade system 10 also includes a storage system 12 and at least one processor 14. The path detection system 100 automatically calculates a shortest path among the blade servers 20. It should be understood that the term "shortest path" may be defined as a shortest distance to transmit packets among all of the blade servers 20 in the blade system 10. It should be understood that the shorter distance that a packet travels among the blade servers 20, the test results will take less time. In one embodiment, the path detection system 100 includes a reading module 110, an obtaining module 120, a calculating module 130, and a setting module 140. The modules 110-140 may comprise computerized code in the form of one or more programs that are stored in the storage system 12. The computerized code includes instructions that are executed by the at least one processor 14 to provide functions for modules 110-140. The storage system 12 may be, but are not limited to, a memory, a hard disk drive, or a cache.

The reading module 110 reads status information of each blade server using a shelf manager of the blade system 10. In one embodiment, the shelf manager includes a software controller or a hardware controller to control the blade servers 20 and obtain the status information of the blade servers 20. In one embodiment, the status information of each blade server 20 includes a name, a serial number, a manufacturing date, a slot number, a slot position, and working status (e.g., normally working or abnormally working).

The obtaining module 120 obtains connection information among the blade servers 20 according to the status information. The connection information includes communication connection among the blade servers 20. It should be understood that the communication connection is an end-to-end logical connection that packets can be sent. For example, if N1 establishes a communication connection with N2, then N1 can send packet to N2. In one embodiment, the obtaining module 120 obtains the connection information according to the slot number. For example, the obtaining module 120 obtains the connection information of N1 according to the slot number of N1. In one embodiment, N1 sends a connection command to N2 to establish the communication connection. If N2 receives the connection command and automatically sends a feedback message to N1, N1 establishes the communication connection with N2. The obtaining module 120 reads the feedback message from N1 and determines that N1 has established the communication connection with N2.

The calculating module 130 calculates a shortest path among the blade servers 20 according to the connection information. In one embodiment, the shortest path is calculated by a depth-first search (DFS) algorithm. It is understood that DFS is an algorithm for traversing or searching a tree structure or a graph (e.g., FIG. 4) to calculate a shortest path.

The setting module 140 sets a configuration file of each blade server 20 according to the calculated shortest path. In one embodiment, the configuration file includes one or more commands to control the route to transmit packets among the blade servers 20. The command may be, but is not limited to, a character string, such as, "from N1 to N3." Taking N1 for example, if the setting module 140 sets the command in the configuration file as "from N1 to N3", then the packets in the N1 are transmitted to N3.

Figure 3:
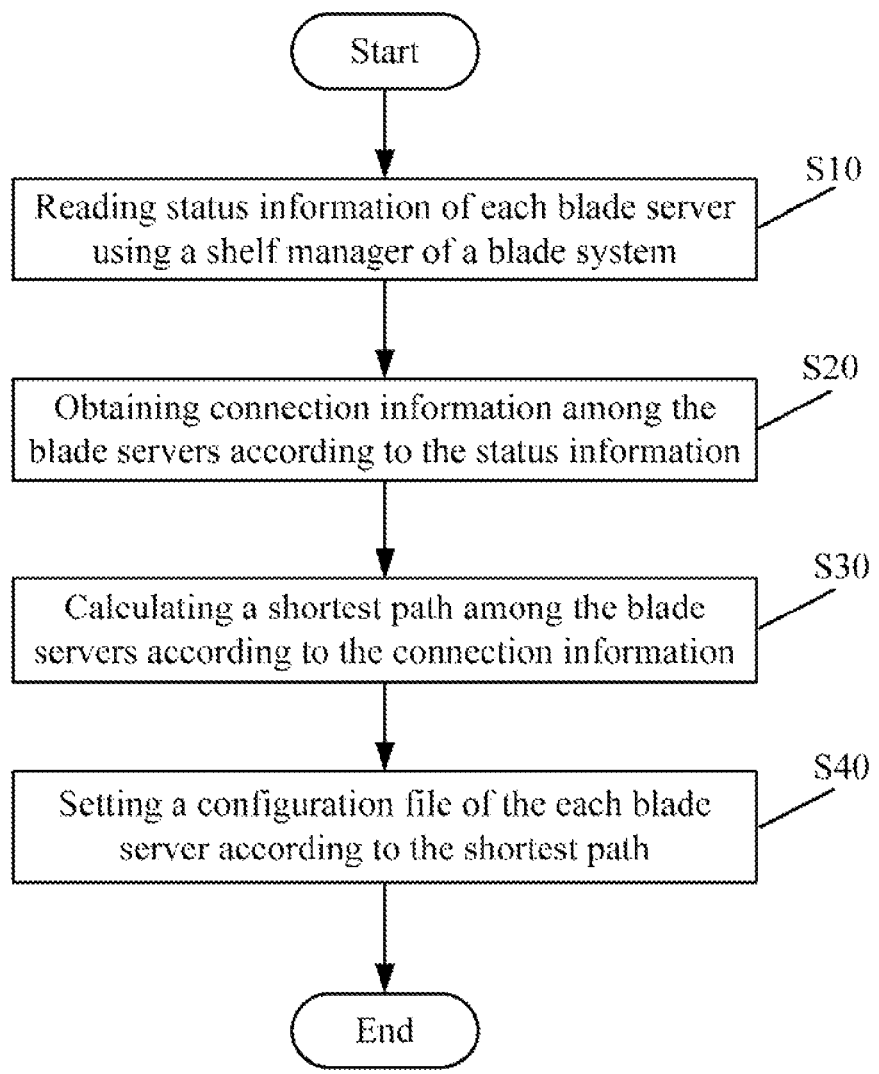
FIG. 3 is a flowchart of one embodiment of a method for establishing a shortest path to transmit packets among blade servers of the blade system.

FIG. 3 is a flowchart of one embodiment of a method for establishing a shortest path in the blade system 10. The method may be used to calculate a shortest path among the blade servers 20 of the blade system 10. Depending on the embodiment, additional blocks may be added, others deleted, and the ordering of the blocks may be changed.

In block S10, the reading module 110 reads status information of each blade server 20 using a shelf manager of the blade system 10. As mentioned above, the status information of each blade server 20 includes a name, a serial number, a manufacturing date, a slot number, a slot position, and working status (e.g., work normally or work abnormally).

Figure 4:
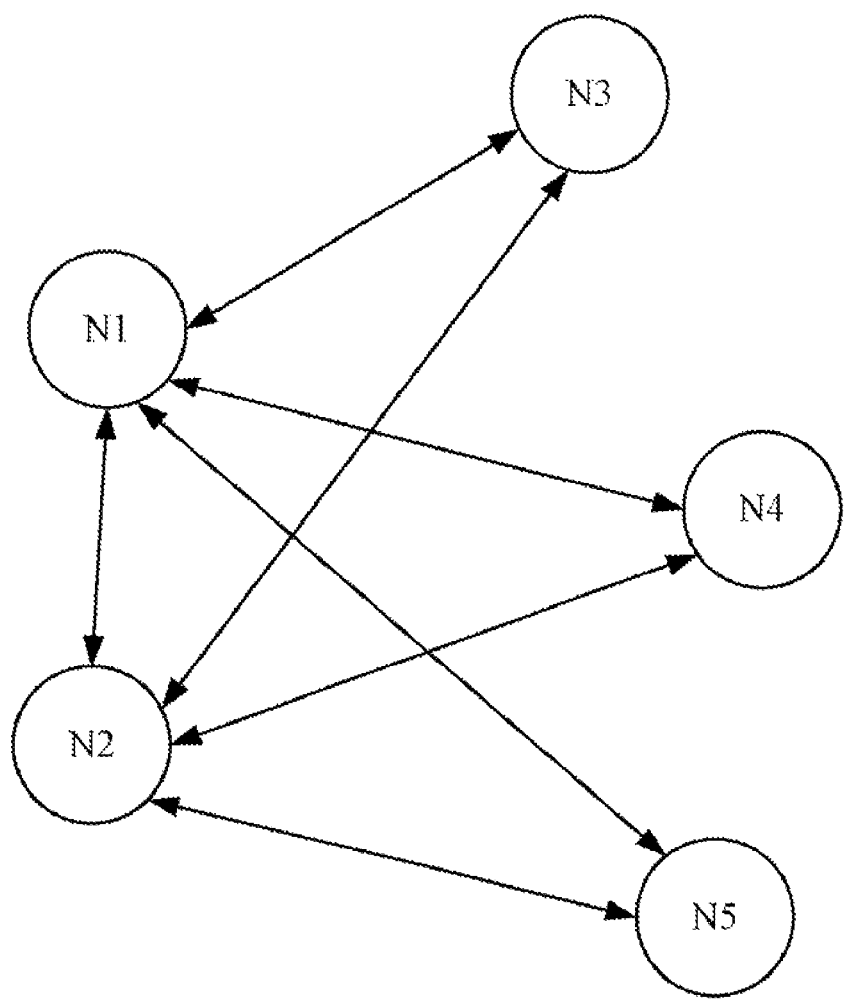
FIG. 4 illustrates one embodiment of communication connections among the blade servers of the blade system.

In block S20, the obtaining module 120 obtains connection information among blade servers 20 according to the status information. For example, the obtaining module 120 obtains the connection information of N1 according to the slot number of N1. In one embodiment, N1 sends a connection command to N2 to establish the communication connection. If N2 receives the connection command and automatically sends a feedback message to N1, N1 establishes the communication connection with N2. The obtaining module 120 reads the feedback message from N1 and determines that N1 has established the communication connection with N2. In one exemplary embodiment, the feedback message may be, but is not limited to, a character string, such as, "OK." As shown in FIG. 4, each circle denotes a blade server 20, each line between two blade servers 20 denotes a communication connection. For example, N1 has a line with N2, N3, N4 and N5, it is understood that N1 establishes the communication connection with N2, N3, N4 and N5. In addition, if the two blade servers 20 have no line between each other, the two blade servers 20 do not establish the communication connection. For example, N3 does not establish the communication connection with N4.

In block S30, the calculating module 130 calculates a shortest path among the blade servers 20 according to the connection information. In one embodiment, the shortest path is calculated by a depth-first search (DFS) algorithm. It is understood that DFS is an algorithm for traversing or searching a tree structure or a graph (e.g., FIG. 4) to calculate a shortest path. For example, the shortest path is calculated as N1N3N2N4N1N5, and then the shortest path for transmitting the packets among the blade servers 20 is from N1 to N3 to N2 to N4 to N1 to N5.

In block S40, the setting module 140 sets a configuration file of each blade server 20 according to the calculated shortest path. In one embodiment, if the shortest path is N1N3N2N4N1N5, the setting module 140 sets a first command in the configuration file of N1 to transmit the packets from N1 to N3, and sets a command in the configuration file of N3 to transmit the received packets from N3 to N2, and sets a command in the configuration file of N2 to transmit the received packets from N2 to N4, and sets a command in the configuration file of N4 to transmit the received packets from N4 to N1, and sets a second command in the configuration file of N1 to transmit the received packets from N1 to N5.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A blade system, comprising:
    one or more blade servers;
    a storage system;
    at least one processor; and
    a path detection system stored in the storage system and being executable by the at least one processor, the path detection system comprising:
    a reading module operable to read status information of each blade server of the blade system using a shelf manager of the blade system, wherein the status information of said each blade server comprises a name, a serial number, a manufacturing data, a slot number, a slot position, and working status;
    an obtaining module operable to obtain connection information among the blade servers according to the status information;
    a calculating module operable to calculate a shortest path among the blade servers according to the connection information, wherein the shortest path is calculated by a depth-first search (DFS) algorithm; and
    a setting module operable to set a configuration file of said each blade server according to the calculated shortest path, wherein the configuration file includes one or more commands to control a route for transmitting the packets among the blade servers.

2. The system of claim 1, wherein the blade system is an advanced telecom computing architecture (ATCA) blade system.

3. The system of claim 1, wherein the connection information comprises communication connection among the blade servers.

4. A computer-based method for establishing a shortest path in a blade system, the method comprising:
    reading status information of each blade server of the blade system using a shelf manager of the blade system, wherein the status information of said each blade server comprises a name, a serial number, a manufacturing data, a slot number, a slot position, and working status;
    obtaining connection information among the blade servers according to the status information;
    calculating a shortest path among the blade servers according to the connection information, wherein the shortest path is calculated by a depth-first search (DFS) algorithm; and
    setting a configuration file of said each blade server according to the calculated shortest path, wherein the configuration file includes one or more commands to control a route for transmitting the packets among the blade servers.

5. The method of claim 4, wherein the blade system is an advanced telecom computing architecture (ATCA) blade system.

6. The method of claim 4, wherein the connection information comprises communication connection among the blade servers.

7. A non-transitory computer-readable medium having stored thereon instructions that, when executed by a computing device, causing the computing device to perform a method for establishing a shortest path in a blade system, the method comprising:
    reading status information of each blade server of the blade system using a shelf manager of the blade system, wherein the status information of said each blade server comprises a name, a serial number, a manufacturing data, a slot number, a slot position, and working status;
    obtaining connection information among the blade servers according to the status information;
    calculating a shortest path among the blade servers according to the connection information, wherein the shortest path is calculated by a depth-first search (DFS) algorithm; and
    setting a configuration file of said each blade server according to the calculated shortest path, wherein the configuration file includes one or more commands to control a route for transmitting the packets among the blade servers.

8. The medium of claim 7, wherein the blade system is an advanced telecom computing architecture (ATCA) blade system.

9. The medium of claim 7, wherein the connection information comprises communication connection among the blade servers.

* * * * *